US012671195B2

(12) United States Patent
Chen

(10) Patent No.: US 12,671,195 B2
(45) Date of Patent: Jun. 30, 2026

(54) ELECTRICAL CARD CONNECTOR APPLYING UNIFORM INSERTION FORCE

(71) Applicant: OUPIIN ELECTRONIC(KUNSHAN) CO., LTD, Kunshan City (CN)

(72) Inventor: Hsin Chih Chen, Kunshan City (CN)

(73) Assignee: OUPIIN ELECTRONICKUNSHAN) CO., LTD, Kunshan City (CN)

( * ) Notice: Subject to any disclaimer, the term of this patent is extended or adjusted under 35 U.S.C. 154(b) by 313 days.

(21) Appl. No.: 18/408,863

(22) Filed: Jan. 10, 2024

(65) Prior Publication Data

US 2025/0038439 A1 Jan. 30, 2025

(30) Foreign Application Priority Data

Jul. 27, 2023 (CN) .......................... 202310935256.0
Jul. 27, 2023 (CN) ......................... 202322001789.X

(51) Int. Cl.
*H01R 12/71* (2011.01)
*H01R 13/635* (2006.01)
(Continued)

(52) U.S. Cl.
CPC ......... *H01R 12/716* (2013.01); *H01R 13/635* (2013.01); *G06K 7/0021* (2013.01); *G06K 7/0026* (2013.01); *G06K 7/0056* (2013.01); *G06K 7/0082* (2013.01); *G06K 13/08* (2013.01); *G06K 13/0806* (2013.01); *G06K 13/0812* (2013.01); *G06K 13/0818* (2013.01); *G06K 13/0825* (2013.01); *G06K 13/0831* (2013.01); *H01R 12/71* (2013.01); *H01R 12/712* (2013.01);
(Continued)

(58) Field of Classification Search
CPC .... H01R 12/716; H01R 13/635; H01R 12/71; H01R 12/712; H01R 12/714; H01R 13/62; H01R 13/629; H01R 13/633; G06K 7/0021; G06K 7/0026; G06K 7/0056; G06K 7/0082; G06K 13/08; G06K 13/0806; G06K 13/0812; G06K 13/0818; G06K 13/0825; G06K 13/0831
See application file for complete search history.

(56) References Cited

U.S. PATENT DOCUMENTS

2021/0305735 A1* 9/2021 Oosaka ................ H01R 12/716

FOREIGN PATENT DOCUMENTS

CN 104600495 A * 5/2015 ........... H01R 13/502

\* cited by examiner

*Primary Examiner* — Justin M Kratt
(74) *Attorney, Agent, or Firm* — Nathan & Associates Patent Agents Ltd.; Menachem Nathan

(57) ABSTRACT

An electrical card connector is disclosed in this application, including an insulating base, a plurality of first conductive terminals, a plurality of second conductive terminals and a pair of balance terminals. The pair of balance terminals are fixed on two opposite side walls. Elastic pressure arms of the pair of balance terminals commonly clamp two side edges of an electronic card when the electronic card is inserted into an accommodation space and touches first elastic arms of the first conductive terminals. Sliding portions of the pair of balance terminal slide along the corresponding side walls when the elastic pressure arms clamp the electronic card and the electronic card continues to be inserted. The sliding portions enter openings of the corresponding side walls to release at least a portion of a clamping force when the electronic card touches second elastic arms of the second conductive terminals.

8 Claims, 10 Drawing Sheets

(51) Int. Cl.

| | |
|---|---|
| G06K 7/00 | (2006.01) |
| G06K 13/08 | (2006.01) |
| H01R 13/62 | (2006.01) |
| H01R 13/629 | (2006.01) |
| H01R 13/633 | (2006.01) |

(52) U.S. Cl.

CPC ............ *H01R 12/714* (2013.01); *H01R 13/62* (2013.01); *H01R 13/629* (2013.01); *H01R 13/633* (2013.01)

ELECTRICAL CARD CONNECTOR APPLYING UNIFORM INSERTION FORCE

FIELD OF ART

The present application relates to a field of connector technology, and more specifically to an electrical card connector that can provide a smooth insertion of an electronic card.

BACKGROUND OF DISCLOSURE

A traditional electrical card connector usually considers an issue of electronic card damage by oblique insertion of an electronic card when designing, and rarely considers one problem of uneven force during an insertion process of the card and resulting in a poor user experience feeling.

For example, a Chinese patent document with publication number CN2932674Y discloses an electrical card connector to be used for inserting an electronic card. The electrical card connector includes an insulating body, a plurality of conductive terminals contained in the insulating body, a striking flake for locking the card, a supporting flake for guiding the electronic card to insert and a shading shell covering the insulating body. Wherein, the insulating body is provided with a containing groove for containing the electronic card, and the supporting flake includes a base portion held in the insulating body and a pair of elastic arms extended into the containing groove. The supporting flake can guide the electronic card to be inserted along a correct direction, thereby solving the problem of oblique insertion of the electronic card.

However, the above mentioned electrical card connector does not emphasize the variation of the insertion force of the electronic card. In the above structure, the supporting flake will cause changes in an initial insertion force and an intermediate insertion force of the electronic card. Specifically, at an initial insertion stage of the electronic card, the electronic card just touches the supporting flake and its initial insertion force is small; while at an intermediate insertion stage of the electronic card, the electronic card touches the conductive terminals and its intermediate insertion force increases.

The problem of varying insertion forces of the electronic card is particularly present in an electronic card connector with double rows of conductive terminals. Specifically, in the electronic card connector with double rows of conductive terminals, at an initial insertion stage of the electronic card, the electronic card only touches a first row of conductive terminals and its initial insertion force is small. But at an intermediate insertion stage of the electronic card, the electronic card touches a second row of conductive terminals, while still maintaining touch with the first row of conductive terminals, so its insertion force increases steeply. This unbalanced or uneven insertion force will result in a poor user experience feeling, and even users may not dare to continue inserting the electronic card into the connector, thus affecting the normal use of the electronic card and the electrical card connector.

Hence, it is urgent to provide a new electrical card connector to solve the above problem of the poor user experience feeling caused by the uneven insertion force during the insertion process of the electronic card.

BRIEF SUMMARY OF DISCLOSURE

One object of the present application is to provide an electrical card connector that ensures an uniform insertion force and a smooth insertion of an electronic card throughout an insertion stage, improves quality of the electrical card connector, and enhances the user experience feeling of card insertion.

Other objects and advantages of the present application may be further understood from technical features disclosed by the present application.

To achieve the above objects of the present application, the present application adopts the following technical solution.

An electrical card connector comprises an insulating base, a plurality of first conductive terminals, a plurality of second conductive terminals and a pair of balance terminals. The insulating base has a bottom wall, two side walls being disposed on the bottom wall and being opposite to each other, an accommodation space and a card insertion port. The accommodation space and the card insertion port are defined by the bottom wall and the side walls. Each side wall is provided with an sliding surface facing the accommodation space, and an opening far away from the card insertion port. The first conductive terminals are arranged in a first row and are retained in the bottom wall. Each first conductive terminal has a first elastic arm, which is adjacent to the card insertion port and at least a portion of which extends into the accommodation space. The second conductive terminals are arranged in a second row and are retained in the bottom wall. Each second conductive terminal has a second elastic arm, which is far away from the card insertion port and at least a portion of which extends into the accommodation space. The pair of balance terminals are retained in the side walls. Each balance terminal includes a fixed end, an elastic pressure arm and a sliding portion disposed in sequence. The fixed end is adjacent to the card insertion port. The elastic pressure arm is bent and extends along the corresponding side wall, and the elastic pressure arm at least partially extends into the accommodation space. Wherein, the elastic pressure arms of the pair of balance terminals are used to clamp two side edges of an electronic card and exert a clamping force on the electronic card when the electronic card is inserted into the accommodation space and touches the first elastic arms. Wherein, the sliding portions of the pair of balance terminals are used to slide along the sliding surfaces of the corresponding side walls when the elastic pressure arms clamp the electronic card and the electronic card continues to be inserted. Wherein, the sliding portions of the pair of balance terminals are capable of entering the corresponding openings and allowing the elastic pressure arms to release at least a portion of the clamping force on the electronic card when the electronic card touches the second elastic arms.

In one embodiment, the opening is adjacent to the sliding surface, and the sliding surface includes an arc surface adjacent to the opening.

In one embodiment, the side wall has a near position adjacent to the card insertion port, an intermediate position and an end position far away from the card insertion port; the opening is disposed on the end position, or between the intermediate position and the end position.

In one embodiment, the first conductive terminals of the first row and the second conductive terminals of the second row are disposed in parallel; and the first elastic arm and the second elastic arm are arranged in two parallel rows.

In one embodiment, the first conductive terminal has a first retaining portion and a first tail portion; the first retaining portion is U-shaped and is used to retain the first conductive terminal in a first terminal-retaining groove of the bottom wall; the first tail portion is vertically bent downward from one end portion of the retaining portion and extends out of a bottom surface of the bottom wall; the first elastic arm is a hooked structure formed by U-shaped bending upward from the other end portion of the retaining portion, and the hooked structure has a first contact portion protruding toward the accommodation space and being used to electrically contact the electronic card. In one embodiment, the second conductive terminal has a second retaining portion and a second tail portion; the second retaining portion is straight and is used to retain the second conductive terminal in a second terminal-retaining groove of the bottom wall; the second tail portion is vertically bent downward from one end portion of the retaining portion and extends out of a bottom surface of the bottom wall; the second elastic arm is an inverted V-shaped structure formed by U-shaped bending upward from the other end portion of the retaining portion, and the inverted V-shaped structure has a second contact portion protruding toward the accommodation space and being used to electrically contact the electronic card.

In one embodiment, the fixed end of the balance terminal is retained in a third terminal-retaining groove of the side wall; the elastic pressure arm is L-shaped; the sliding portion is a protrusion toward the sliding surface.

In one embodiment, the insulating base includes a retaining wall disposed on the bottom wall and perpendicular to the side walls; the retaining wall and the card insertion port are disposed opposite to each other; the accommodation space is defined by the bottom wall, the side walls and the retaining wall together.

In one embodiment, the electrical card connector further comprises a terminal module, a bearing seat, a card ejection mechanism and a shell; the terminal module includes the insulating base, the first conductive terminals, the second conductive terminals and the balance terminals; and the terminal module is retained in the bearing seat; the bearing seat has a top wall above the accommodation space to define the accommodation space; the card ejection mechanism is mounted to the bearing seat and at least includes a push rod and an elastic member; one end of the push rod is connected to the elastic member, passes through a through hole of the retaining wall, extends into the accommodation space and faces a front edge of the electronic card; and the other end of the push rod extends out of the bearing seat; the shell is used to cover the bearing seat.

In comparison with the prior art, the electrical card connector of the present application disposes the pair of balance terminals to exert the clamping force on the electronic card in a first insertion stage of the electronic card and release the clamping force in a second insertion stage of the electronic card, whereby the clamping force will not increase dramatically due to the touch of the electronic card and the second elastic arm. The electrical card connector of the present application can ensure an uniform insertion force and a smooth insertion of an electronic card throughout an insertion stage, and enhances the user experience feeling of card insertion.

DETAILED DESCRIPTION OF PREFERRED EMBODIMENTS

Figure 1:
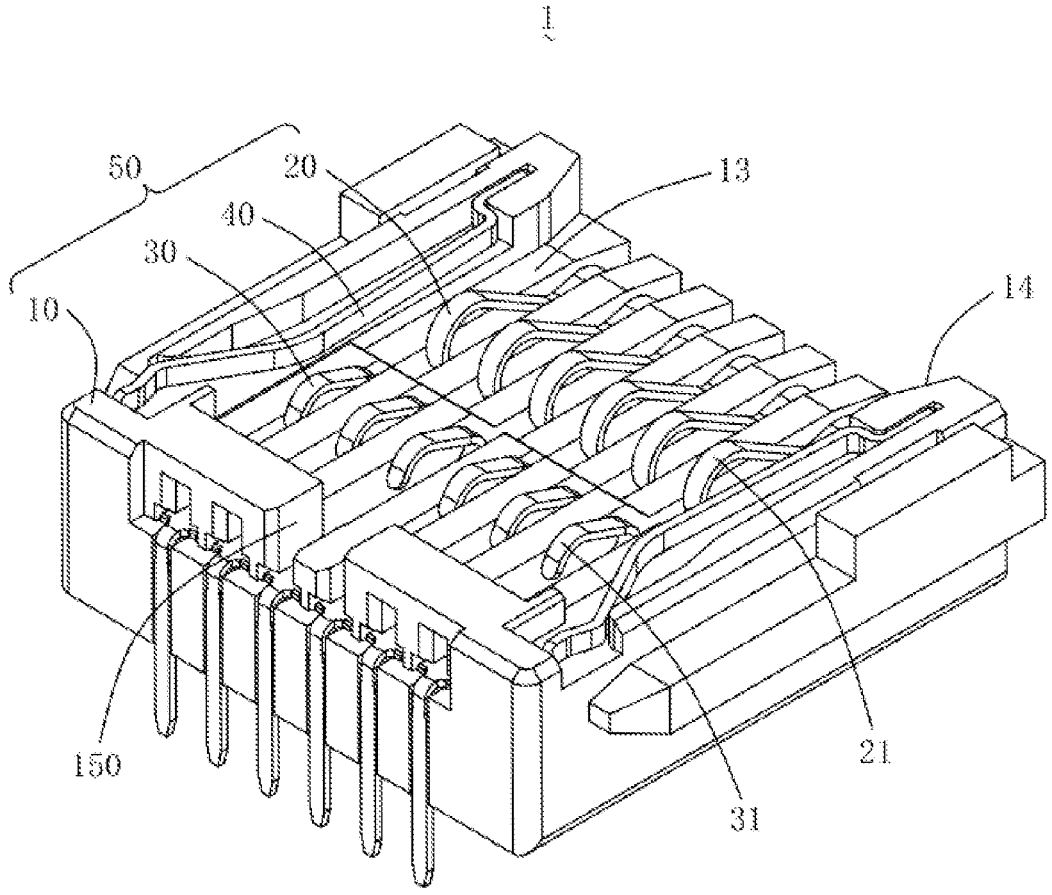
FIG. 1 is a perspective schematic view of a terminal module of an electrical card connector of the present application.

The following description of every embodiment with reference to the accompanying drawings is used to exemplify a specific embodiment, which may be carried out in the present application. Directional terms mentioned in the present application, such as "top", "bottom", "front", "back", "left", "right", "top", "bottom" etc., are only used with reference to the orientation of the accompanying drawings. Therefore, the used directional terms are intended to illustrate, but not to limit, the present application.

Please refer to FIGS. 1 to 4, an electrical card connector 1 of the present application is used to connect an electronic card to a circuit board. The electrical card connector 1 includes an insulating base 10, a plurality of first conductive terminals 20 arranged in a first row, a plurality of second conductive terminals 30 arranged in a second row and a pair of balance terminals 40. In one embodiment, the insulating base 10, the first conductive terminals 20, the second conductive terminals 30 and the balance terminals 40 together constitute a terminal module 50. The terminal module 50 is connected to other components of the electrical card connector 1. More details of the other components will be given later.

Figure 2:
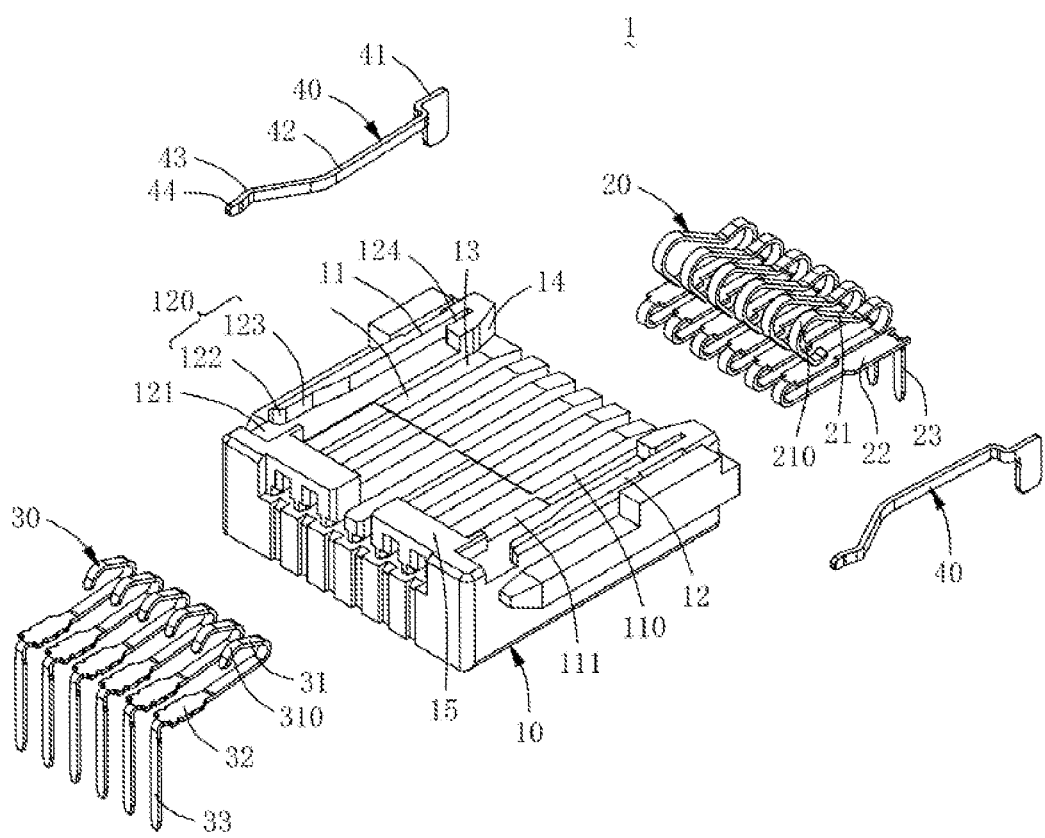
FIG. 2 is an exploded view of the terminal module shown in FIG. 1.
Figure 4:
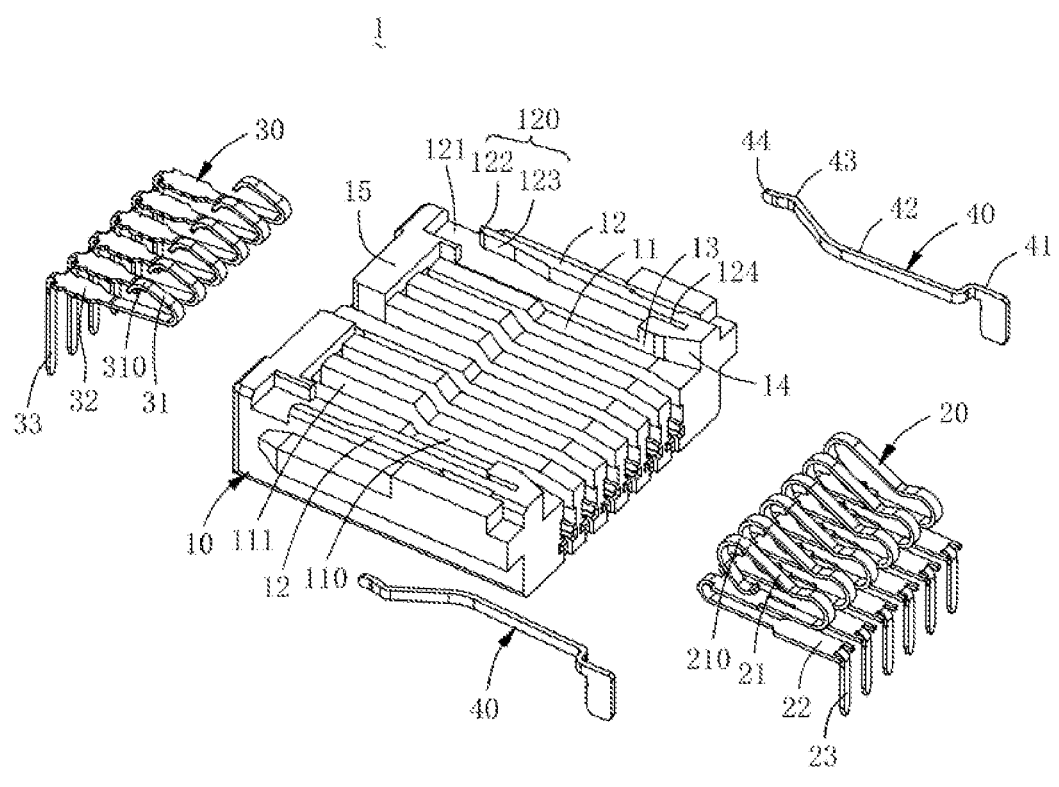
FIG. 4 is an exploded view of the terminal module shown in FIG. 3.

Referring to FIGS. 2 and 4, the insulating base 10 has a bottom wall 11, two side walls 12 being disposed on the bottom wall 11 and being opposite to each other, an accommodation space 13 and a card insertion port 14. The accommodation space 13 and the card insertion port 14 are defined by the bottom wall 11 and the side walls 12. Each side wall 12 is provided with an sliding surface 120 facing the accommodation space 13. The side wall 12 forms an opening 121 far away from the card insertion port 14.

In one embodiment, as shown in FIGS. 2 and 4, the opening 121 is adjacent to the sliding surface 120. The sliding surface 120 includes an arc surface 122 adjacent to the opening 121 and a vertical surface 123 connected to the arc surface 122.

In one embodiment, as shown in FIGS. 2 and 4, the insulating base 10 further includes a retaining wall 15 disposed on the bottom wall 11 and perpendicular to the side walls 12. The accommodation space 13 is defined by the bottom wall 11, the side walls 12 and the retaining wall 15 together. The retaining wall 15 and the card insertion port 14 are disposed opposite to each other.

In one embodiment, as shown in FIGS. 2 and 4, the side wall 12 has a near position near the card insertion port 14, an intermediate position and an end position far away from the card insertion port 14. The opening 121 is located on the end position of the side wall 12, as shown in FIG. 2. But, in other embodiment, the opening 121 may also be located between the intermediate position and the end position. Namely, in a specific design, the location of the opening 121 may be adjusted according to structure and size of an actual product.

Moreover, in one embodiment, as shown in FIGS. 2 and 4, the bottom wall 11 is provided with one row of first terminal-retaining grooves 110 and one row of second terminal-retaining grooves 111. The first terminal-retaining grooves 110 are used to retain the first conductive terminals 20, and the second terminal-retaining grooves 111 are used to retain the second conductive terminals 30. Each side wall 12 is provided with a third terminal-retaining groove 124 for retaining the corresponding balance terminal 40. Specifically, the third terminal-retaining groove 124 is located on the end position of the side wall 12.

Figure 3:
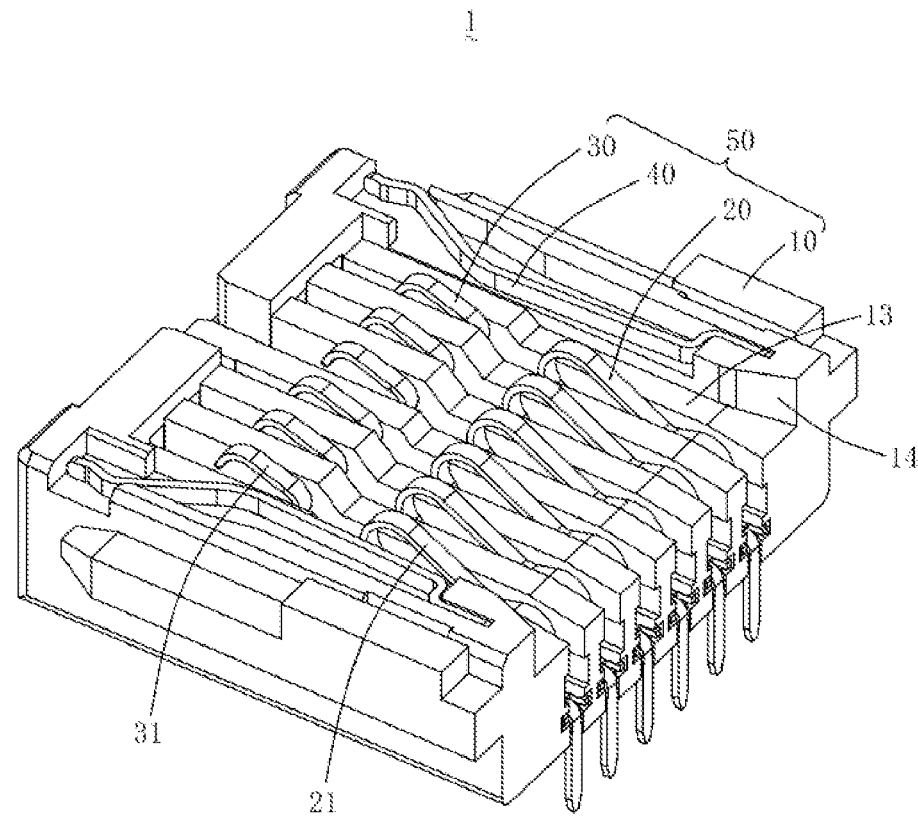
FIG. 3 is a perspective schematic view of the terminal module of the electrical card connector of the present application along another direction.

Please refer to FIGS. 1 and 3, the first conductive terminals 20 of the first row and the second conductive terminals 30 of the second row are disposed in parallel. The first conductive terminals 20 of the first row are closer to the card insertion port 14 than the second conductive terminals 30 of the second row.

Referring to FIGS. 1 and 3, each first conductive terminal 20 is retained in the bottom wall 11 and has a first elastic arm 21. The first elastic arm 21 is adjacent to the card insertion port 14 and at least a portion of the first elastic arm 21 extends into the accommodation space 13. Similarly, each second conductive terminal 30 is retained in the bottom wall 11 and has a second elastic arm 31. The second elastic arm 31 is far away from the card insertion port 14 and at least a portion of the second elastic arm 31 extends into the accommodation space 13.

Referring to FIGS. 2 and 4, the first conductive terminal 20 further has a first retaining portion 22 and a first tail portion 23. The first retaining portion 22 is U-shaped and is used to retain the first conductive terminal 20 in a first terminal-retaining groove 110. The first tail portion 23 is vertically bent downward from one end portion of the retaining portion 22 and extends out of a bottom surface of the bottom wall 11 for connecting the first conductive terminal 20 to the circuit board. The first elastic arm 21 is a hooked structure, which is formed by U-shaped bending upward from the other end portion of the retaining portion 22. A large portion of the hooked structure is exposed to the accommodation space 13. The hooked structure has a first contact portion 210 protruding toward the accommodation space 13. The first elastic arm 21 is used to provide an elastic contact force for the electronic card, and the first contact portion 210 is used to form an electrical connection with the electronic card.

Referring to FIGS. 2 and 4, the second conductive terminal 30 has a second retaining portion 32 and a second tail portion 33. The second retaining portion 32 is straight and is used to retain the second conductive terminal 30 in a second terminal-retaining groove 111. The second tail portion 33 is vertically bent downward from one end portion of the retaining portion 32, extends out of a bottom surface of the bottom wall 11, and is used to connect the second conductive terminal 30 to the circuit board. The second elastic arm 31 is an inverted V-shaped structure, which is formed by U-shaped bending upward from the other end portion of the retaining portion 32. A larger portion of the inverted V-shaped structure is exposed to the accommodation space 13. The inverted V-shaped structure has a second contact portion 310 protruding toward the accommodation space 13.

The second elastic arm 31 is used to provide an elastic contact force for the electronic card, and the second contact portion 310 is used to form an electrical connection with the electronic card.

In one embodiment, the first elastic arm 21 and the second elastic arm 31 are arranged in two parallel rows. The first elastic arm 21 is closer to the card insertion port 14. The first tail portion 23 and the second tail portion 33 are disposed opposite to each other. The first tail portion 23 is close to the card insertion port 14, and the second tail portion 33 is close to the retaining wall 15.

Referring to FIGS. 1 and 3, the pair of balance terminals 40 are retained in the corresponding side walls 12.

Referring to FIGS. 2 and 4, each balance terminal 40 includes a fixed end 41, an elastic pressure arm 42 and a sliding portion 43 disposed in sequence. The fixed end 41 is adjacent to the card insertion port 14 and is retained in the third terminal-retaining groove 124.

Figure 5:
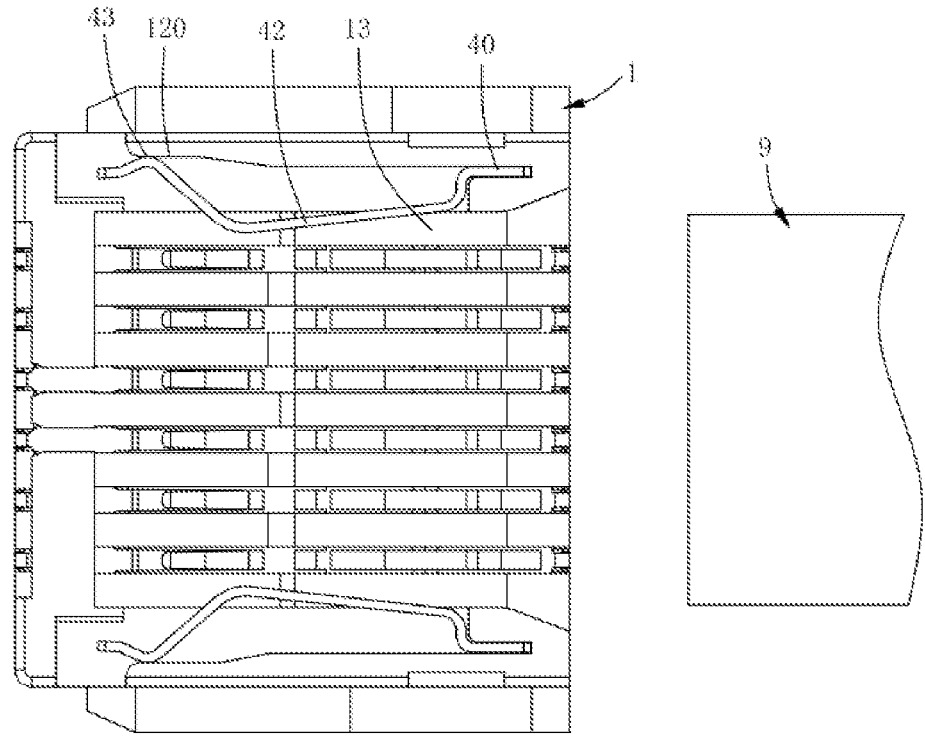
FIG. 5 is a plan view of the terminal module of the present application, which mainly shows the location of a pair of balance terminals before an electronic card is inserted.
Figure 7:
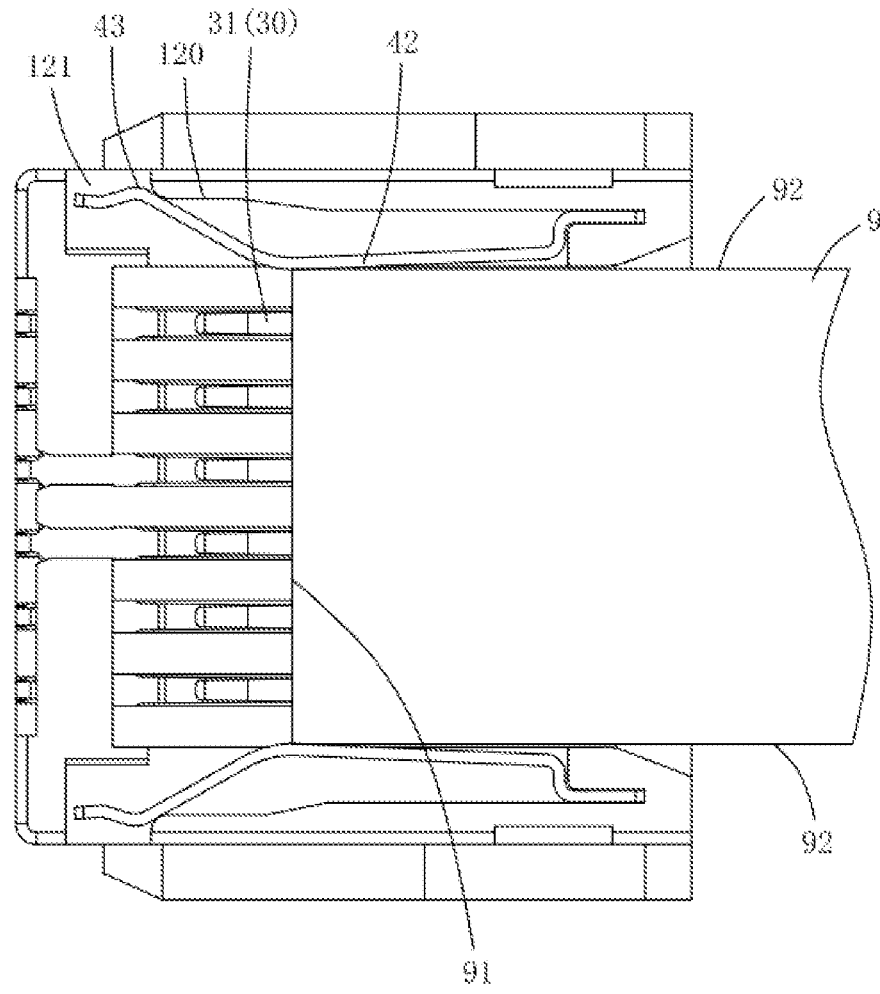
FIG. 7 is a plan view of the terminal module of the present application, wherein the electronic card is in a second insertion stage.

FIGS. 1, 3 and 7 show a deformed state of the elastic pressure arm 42 after the electronic card is fully inserted into the accommodation space 13, and FIG. 5 shows an original state of the elastic pressure arm 42 before the electronic card is inserted into the accommodation space 13. Specifically, referring to FIG. 5, before the electronic card is inserted into the accommodation space 13, the elastic pressure arm 42 is bent, extends along the corresponding side wall 12 and at least partially into the accommodation space 13. In one embodiment, referring to FIGS. 1, 3 and 7, the elastic pressure arm 42 is L-shaped; the sliding portion 43 is a protrusion toward the sliding surface 120, such as an arc protrusion; the sliding portion 43 is capable of smoothly sliding along said sliding surface 120 into the opening 121 under action of an external force. In one embodiment, the balance terminal 40 further has a free end 44, which is far away from the card insertion port 14 and faces the retaining wall 15. The sliding portion 43 is adjacent to the free end 44.

Wherein, the elastic pressure arms 42 of the pair of balance terminals 40 are used to clamp two side edges of the electronic card and exert a clamping force to the electronic card when the electronic card is inserted into the accommodation space 13 and touches the first elastic arms.

Wherein, the sliding portions 43 of the pair of balance terminals 40 are used to slide along the sliding surfaces 120 of the corresponding side walls 12 when the elastic pressure arms 42 clamp the electronic card and the electronic card continues to be inserted.

Wherein, the sliding portions 43 of the pair of balance terminals 40 are capable of entering the corresponding openings 121 and allowing the elastic pressure arms 42 to release at least a portion of the clamping force on the electronic card when the electronic card touches the second elastic arms 31.

The electrical card connector 1 of the present application can obtain an uniform insertion force and a smooth insertion of an electronic card throughout an insertion stage by disposing the pair of balance terminals 40, thereby improving quality of the electrical card connector 1 and enhancing the user experience feeling of card insertion.

Figure 6:
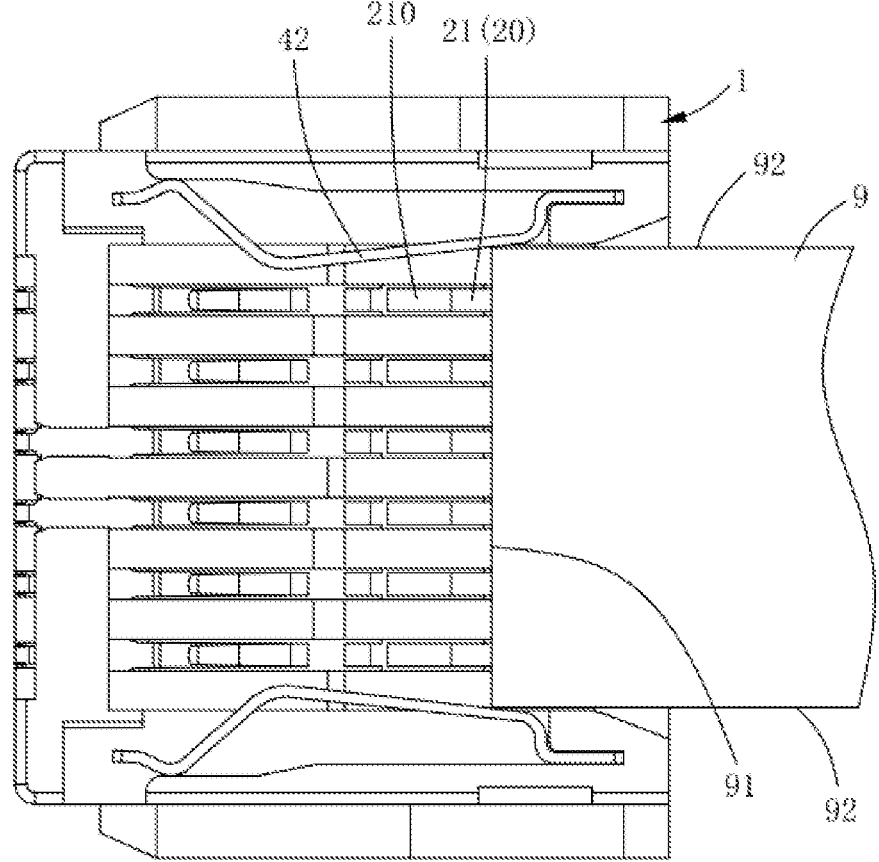
FIG. 6 is a plan view of the terminal module of the present application, wherein the electronic card is in a first insertion stage.

The following will specifically describe an insertion process and working principle of the electrical card connector 1 of the present application in conjunction with FIGS. 5, 6 and 7.

Referring to FIG. 5, before the electronic card 9 is inserted into the accommodation space 13 of the electrical card connector 1, at least a portion of the elastic pressure arm 42 of the balance terminal 40 extends into the accommodation space 13, the sliding portion 43 may rest against the sliding surface 120 or may not rest against the sliding surface 120. In the embodiment of FIG. 5, the sliding portion 43 rests against the sliding surface 120.

Referring to FIG. 6, in a first stage of inserting the electronic card 9 into the accommodation space 13 of the electrical card connector 1, a front edge 91 of the electronic card 9 just touches the first elastic arms 21 of the first conductive terminals 20, and two side edges 92 of the electronic card 9 touch the elastic pressure arms 42 of the pair of balance terminals 40 and are clamped by the elastic pressure arms 42. At this point, the continued insertion of the electronic card 9 will be subject to two resistance forces. A first resistance force is a frictional resistance force exerted by the first elastic arms 21 on the electronic card 9; and a second resistance force is a resistance force due to a clamping force exerted by the elastic pressure arms 42 on the electronic card 9. Therefore, the user will perceive a combined force of the first resistance force and the second resistance force In the first insertion stage, as the electronic card 9 continues to be inserted, its front edge 91 slips over the first elastic arms 21 and the balance terminals 40 are forced to open outwardly. At this point, a bottom of the electronic card 9 contacts the first contact portion 210 electrically, and the frictional resistance force (i.e. the first resistance force) will be slightly reduced. But because at this point the sliding portion 43 is against the sliding surface 120 and slides along the sliding surface 120, the clamping force exerted on the side edges 92 of the electronic card 9 will be slightly increased, so the second resistance force will have a slight increase. Totally, in the first insertion stage, the combined force perceived by the user is roughly constant, and thus the insertion force is essentially constant.

Referring to FIG. 7, in a second stage of inserting the electronic card 9 into the accommodation space 13 of the electrical card connector 1, the front edge 91 of the electronic card 9 just touches the second elastic arms 31 of the second conductive terminals 20, the sliding portions 43 enter the corresponding openings 121 from the sliding surfaces 120. At this point, as the electronic card 9 continues to be inserted, the electronic card 9 is subject to the frictional resistance force (i.e. the first resistance force) exerted by the first elastic arms 21 and a frictional resistance force (which may be referred to as a third resistance force) exerted by the second elastic arms 31. But, because the sliding portions 43 enter the corresponding openings 121, the clamping force exerted by the elastic pressure arms 42 on the side edges of the electronic card 9 is dramatically reduced, which results in a drastic reduction of the second resistance force. Therefore, the addition of the third resistance force and the dramatically reduced second resistance force will result in the combined force perceived by the user remaining roughly constant, and thus the insertion force will be essentially constant.

As described above, the electrical card connector 1 of the present application disposes the pair of balance terminals 40 to exert the clamping force to the electronic card in a first insertion stage of the electronic card and release the clamping force in a second insertion stage of the electronic card, whereby the clamping force will not increase dramatically when the electronic card touches the second elastic arm. The electrical card connector of the present application can ensure an uniform insertion force and a smooth insertion of an electronic card throughout an insertion stage, and enhances the user experience feeling of card insertion.

Figure 8:
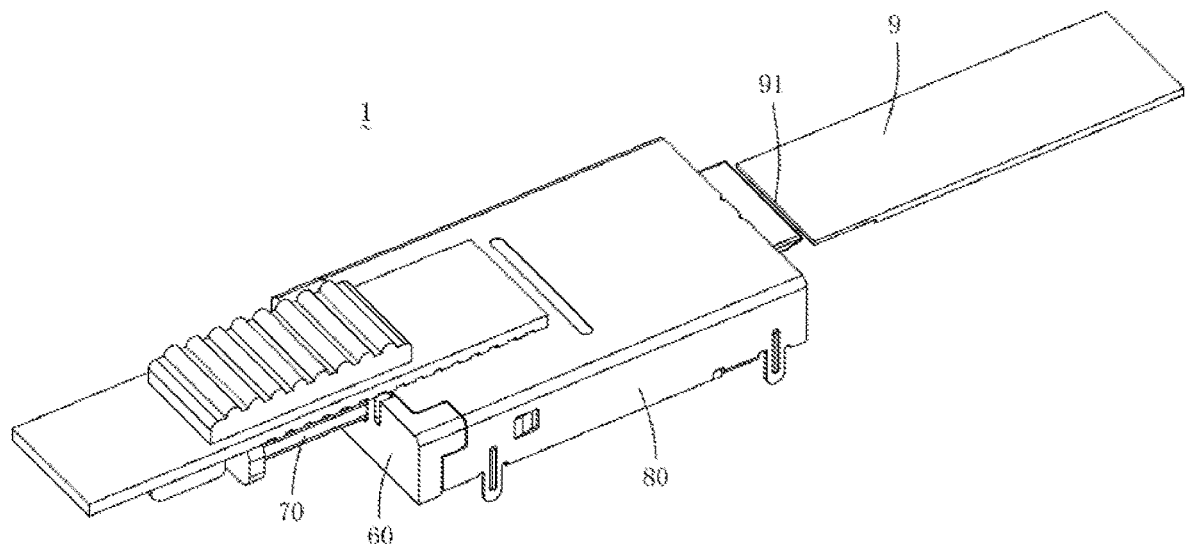
FIG. 8 is a perspective schematic view of the electrical card connector of the present application.
Figure 9:
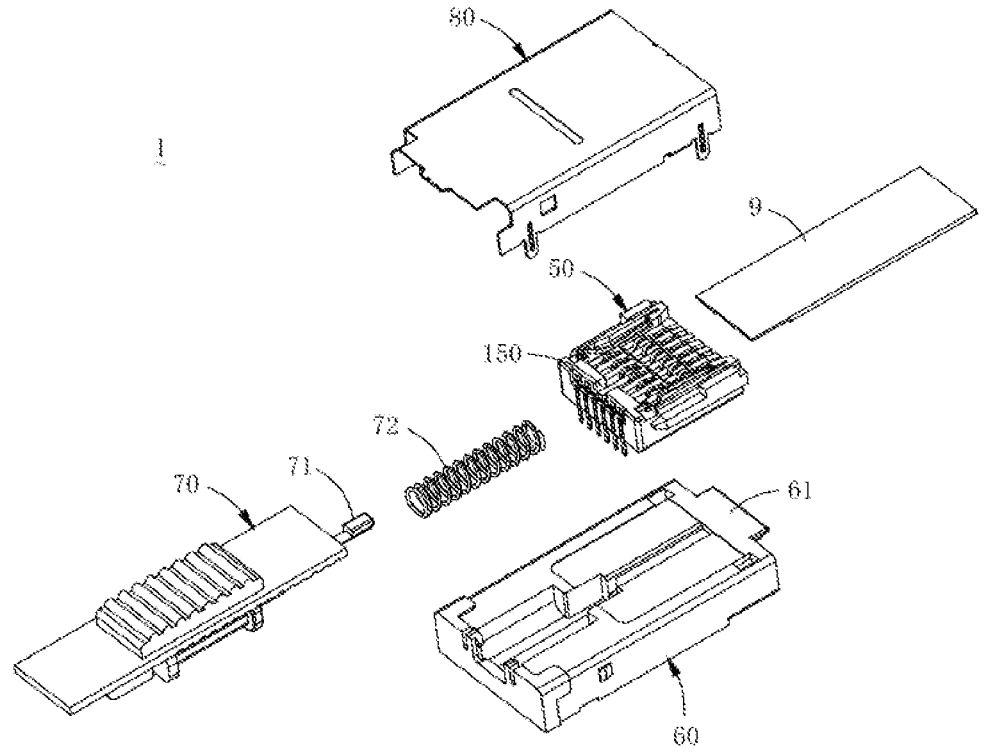
FIG. 9 is an exploded view of the electrical card connector shown in FIG. 8.
Figure 10:
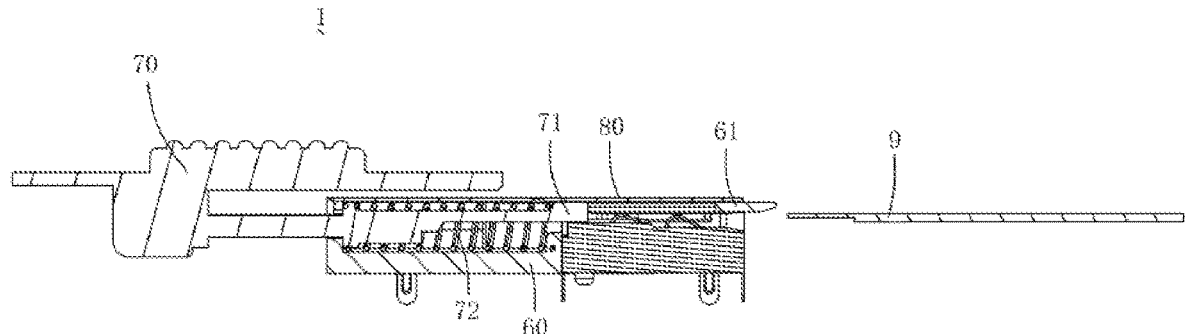
FIG. 10 is a schematic view of a cross-sectional structure of the electrical card connector shown in FIG. 8.

Please refer to FIGS. 8, 9 and 10, the electrical card connector 1 of the present application further includes a bearing seat 60, a card ejection mechanism 70 and a shell 80.

The terminal module 50 is retained in the bearing seat 60. The bearing seat 60 has a top wall 61 above the accommodation space 13 to define the accommodation space 13. The top wall 61 can be served as a top of the accommodation space 13.

The card ejection mechanism 70 is mounted to the bearing seat 60 and at least includes a push rod 71 and an elastic member 72. One end of the push rod 71 is connected to the elastic member 72, passes through a through hole 150 (seen in FIGS. 1 and 9) of the retaining wall 15 to extend into the accommodation space 13, and faces the front edge 91 of the electronic card 9. The other end of the push rod 71 extends out of the bearing seat 60.

The shell 80 is used to cover the bearing seat 60 for fixing or protecting internal components, such as the terminal module 50, the push rod 71, the elastic member 72 and so on.

It should be understood that, the application of the present application is not limited to the above examples listed. Ordinary technical personnel in this field can improve or change the applications according to the above descriptions, all of these improvements and transforms should belong to the scope of protection in the appended claims of the present application.

What is claimed is:

1. An electrical card connector, comprising:

an insulating base having a bottom wall, two side walls being disposed on the bottom wall and being opposite to each other, an accommodation space and a card insertion port; the accommodation space and the card insertion port being defined by the bottom wall and the side walls; each side wall being provided with a sliding surface facing the accommodation space, and an opening far away from the card insertion port; wherein, the opening is adjacent to the sliding surface, and the sliding surface includes an arc surface adjacent to the opening;

a plurality of first conductive terminals being arranged in a first row and being retained in the bottom wall; each first conductive terminal having a first elastic arm, which is adjacent to the card insertion port and at least a portion of which extends into the accommodation space;

a plurality of second conductive terminals being arranged in a second row and being retained in the bottom wall; each second conductive terminal having a second elastic arm, which is far away from the card insertion port and at least a portion of which extends into the accommodation space; and a pair of balance terminals being retained in the side walls; each balance terminal including a fixed end, an elastic pressure arm and a sliding portion disposed in sequence; the fixed end being adjacent to the card insertion port; the elastic pressure arm being bent and extending along the corresponding side wall, and the elastic pressure arm at least partially extending into accommodation space; wherein, the sliding portion is a protrusion toward the sliding surface;

wherein, the elastic pressure arms of the pair of balance terminals are used to clamp two side edges of an electronic card and exert a clamping force on the electronic card when the electronic card is inserted into the accommodation space and touches the first elastic arms;

wherein, the sliding portions of the pair of balance terminals are used to slide along the sliding surfaces of the corresponding side walls when the elastic pressure arms clamp the electronic card and the electronic card continues to be inserted;

wherein, the sliding portions of the pair of balance terminals are capable of entering the corresponding openings and allowing the elastic pressure arms to release at least a portion of the clamping force on the electronic card when the electronic card touches the second elastic arms.

2. The electrical card connector according to claim 1, wherein the side wall has a near position adjacent to the card insertion port, an intermediate position and an end position far away from the card insertion port;

the opening is disposed on the end position, or between the intermediate position and the end position.

3. The electrical card connector according to claim 1, wherein the first conductive terminals of the first row and the second conductive terminals of the second row are disposed in parallel; and the first elastic arm and the second elastic arm are arranged in two parallel rows.

4. The electrical card connector according to claim 3, wherein the first conductive terminal has a first retaining portion and a first tail portion;

the first retaining portion is U-shaped and is used to retain the first conductive terminal in a first terminal-retaining groove of the bottom wall;

the first tail portion is vertically bent downward from one end portion of the retaining portion and extends out of a bottom surface of the bottom wall;

the first elastic arm is a hooked structure formed by U-shaped bending upward from the other end portion of the retaining portion, and the hooked structure has a first contact portion protruding toward the accommodation space and being used to electrically contact the electronic card.

5. The electrical card connector according to claim 3, wherein the second conductive terminal has a second retaining portion and a second tail portion;

the second retaining portion is straight and is used to retain the second conductive terminal in a second terminal-retaining groove of the bottom wall;

the second tail portion is vertically bent downward from one end portion of the retaining portion and extends out of a bottom surface of the bottom wall;

the second elastic arm is an inverted V-shaped structure formed by U-shaped bending upward from the other end portion of the retaining portion, and the inverted V-shaped structure has a second contact portion protruding toward the accommodation space and being used to electrically contact the electronic card.

6. The electrical card connector according to claim 1, wherein the fixed end of the balance terminal is retained in a third terminal-retaining groove of the side wall;

the elastic pressure arm is L-shaped.

7. The electrical card connector according to claim 1, wherein the insulating base includes a retaining wall disposed on the bottom wall and perpendicular to the side walls; the retaining wall and the card insertion port are disposed opposite to each other; the accommodation space is defined by the bottom wall, the side walls and the retaining wall together.

8. The electrical card connector according to claim 7, wherein the electrical card connector further comprises a terminal module, a bearing seat, a card ejection mechanism and a shell;

the terminal module includes the insulating base, the first conductive terminals, the second conductive terminals and the balance terminals; and the terminal module is retained in the bearing seat;

the bearing seat has a top wall above the accommodation space to define the accommodation space;

the card ejection mechanism is mounted to the bearing seat and at least includes a push rod and an elastic member; one end of the push rod is connected to the elastic member, passes through a through hole of the retaining wall, extends into the accommodation space and faces a front edge of the electronic card; and the other end of the push rod extends out of the bearing seat;

the shell is used to cover the bearing seat.

* * * * *